Figure 1A:
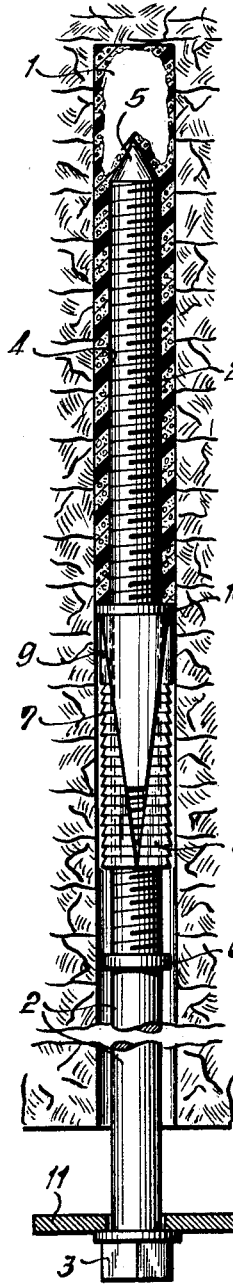

June 15, 1965  F. SCHUERMANN ETAL  3,188,815

ANCHOR BOLT ASSEMBLY

Filed March 27, 1961  4 Sheets-Sheet 1

INVENTORS
Fritz Schuermann
Rudolf Novotny
by Malcolm W Fraser
attorney

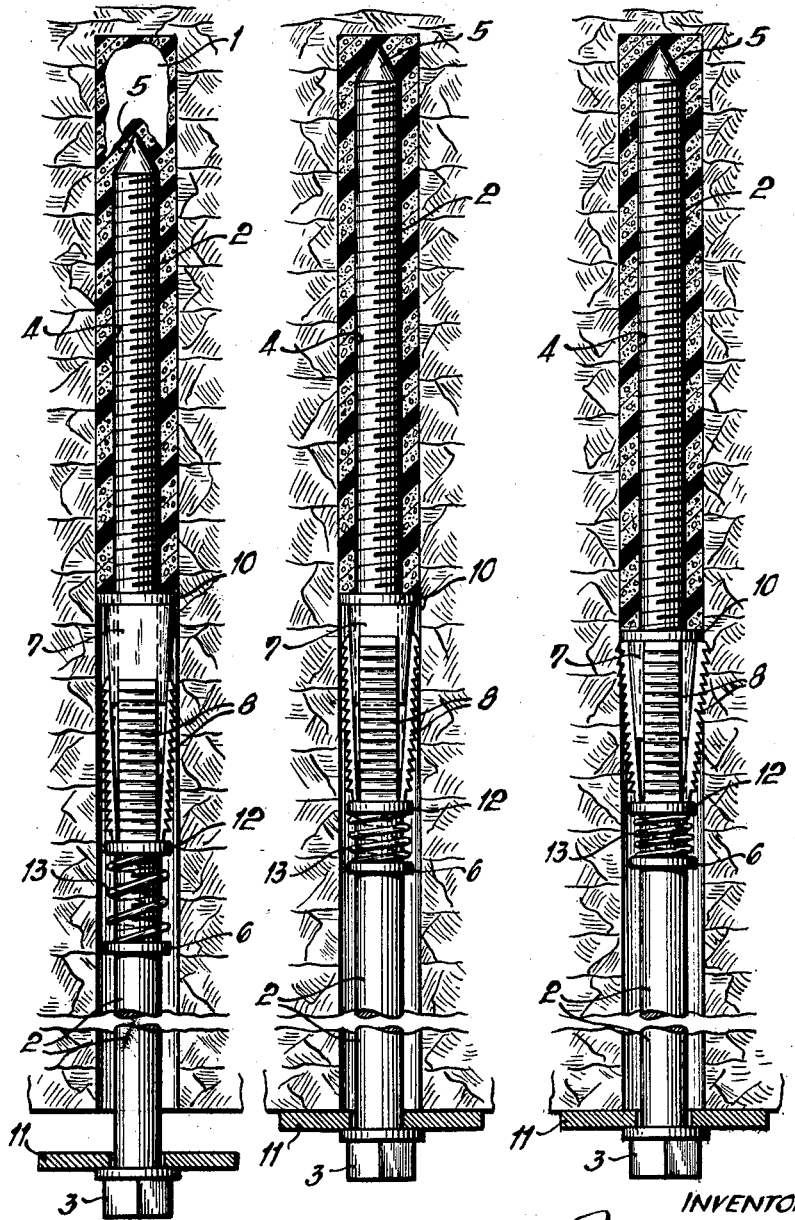

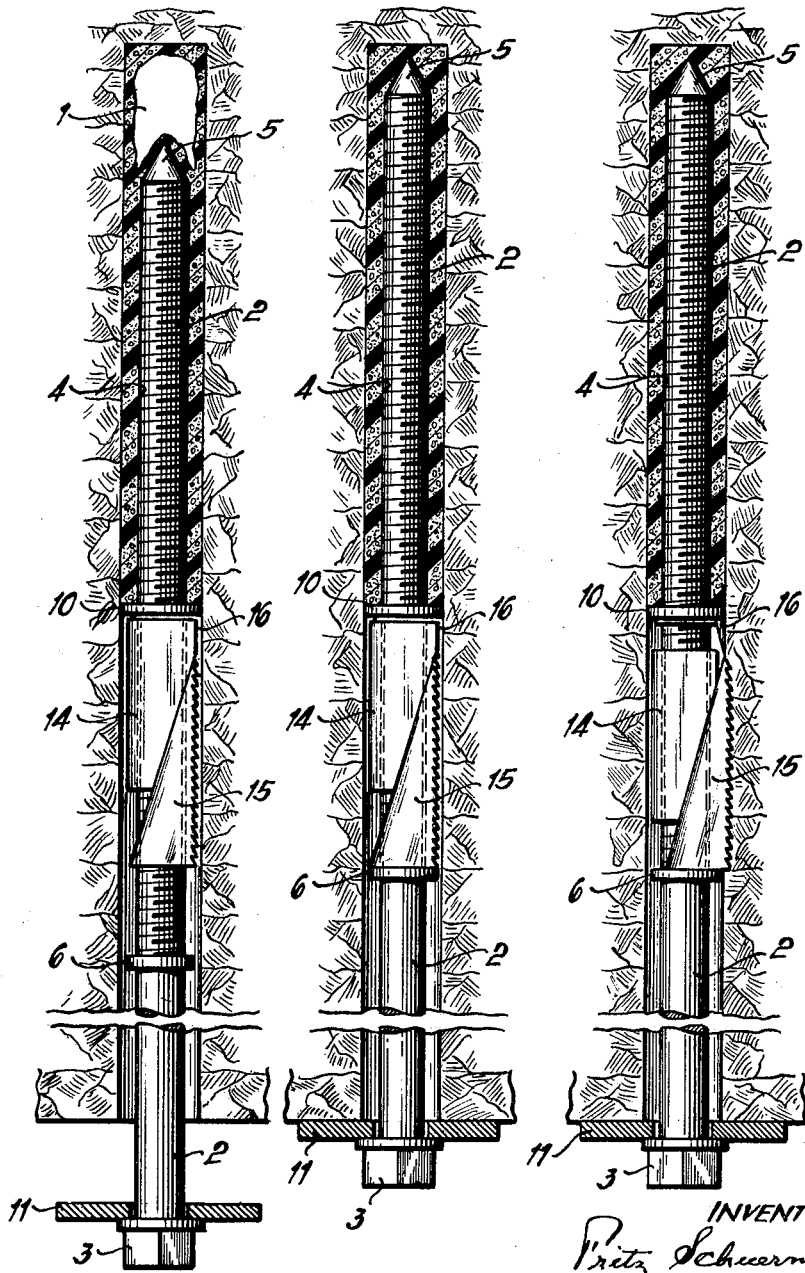

United States Patent Office 3,188,815
Patented June 15, 1965

3,188,815
ANCHOR BOLT ASSEMBLY
Fritz Schuermann, 20 Daimlerstrasse, Essen-Bredeney, Germany, and Rudolf Novotny, 22 Ostpreussenstrasse, Essen-Heisingen, Germany
Filed Mar. 27, 1961, Ser. No. 98,625
Claims priority, application Germany, Apr. 7, 1960, B 57,385
2 Claims. (Cl. 61—45)

The invention relates to the fixing of anchor bolts in drill holes, for example for supporting mine workings, securing overhanging rock walls above ground, and for structural purposes such as reinforcing foundations and for providing facilities for the attachment or mounting of structural parts. The invention provides a method which renders it possible to fix anchor bolts in a drill hole in a single operation in such a manner that the anchor bolts can be loaded immediately after the fixing operation.

The fixing of anchor bolts in drill holes has hitherto generally been effected in a purely mechanical manner by expanding a suitably designed tip of the bolt after the latter has been introduced into the bottom portion of the drill hole. The grip which can be obtained in this way is largely dependent on the properties of the rock in which the drill hole is made and, particularly in soft rock, is insufficient for withstanding the usually desirable loading of the anchor bolt, in particular for long periods of time.

Substantially more advantageous in comparison with purely mechanical fixing is the concreting of the tips of the anchor bolts in the bottom of the drill holes. This method, however, has the drawback that the bolt can be subjected to load only after the cement has hardened which, at the earliest, is usually only after 16 to 24 hours. Because of this, the applications of this method are considerably limited.

This drawback is substantially avoided in another known method in which a plastic substance is employed as the cementing material for producing the bond between the wall of the drill hole and the tip of the anchor bolt. An anchor bolt secured in this way in a drill hole may be fixed in the substantially shorter time, namely about 30 minutes, which is required for the hardening of the plastic which is introduced into the bottom of the drill hole in liquid form or in a doughy form obtained by adding suitable fillers, for example, quartz sand.

However, the short time which is still required before a capacity for withstanding load is obtained does not enable the last-mentioned method, which is most advantageous and is referred to as the "adhesive anchor bolt" principle, to be employed when the anchor bolts are required immediately after insertion to form a load-bearing temporary support system.

Furthermore, when this principle is employed—in its most technically advantageous form—by preparing the cementing mixture in the bottom of the drill hole from the constituents introduced separately in compartments of a cartridge adapted to be destroyed by the driving in of the anchor bolt, there is a factor of uncertainty regarding the adhesive action of the material because this depends on the completion of satisfactory mixing of the constituents, for which a certain minimum number of turns of the anchor bolt is necessary, and thereby on the care and attention of the workers. Such factors of uncertainty, however, are undesirable for reasons of safety.

All of the above-described methods require that the outer end of the anchor bolt which projects from the drill hole be provided over a length of 10 to 15 cm. with a thread onto which is threaded a nut to cause an anchor plate to bear against the surface of the rock surrounding the outer end of the drill hole.

The invention provides a method which avoids drawbacks and difficulties of the known methods for fixing anchor bolts in drill holes and of the known anchor-bolt construction employed therein. More particularly, the invention enables the anchor bolts to be loaded immediately after they have been introduced, a wedging operation being combined in a single operation with that of introducing the anchor bolt into the drill hole.

The method according to the invention consists, according to its basic idea, in that, while the tip of the anchor bolt is cemented into the bottom of the drill hole by means of a plastic or cement mixture, a zone of the anchor bolt which lies outwardly of the tip thereof fixed in this way is wedged mechanically against the wall of the drill hole by driving in or rotating said anchor bolt in a manner such that the anchor plate of the bolt is braced against the rock by merely rotating said anchor bolt further while using the wedged zone of the bolt as an abutment.

According to a preferred form of the novel method, the latter is carried out by introducing the constitutents of a plastic or mortar mixture into the bottom of the drill hole in manner known per se in separate compartments of a cartridge which is destroyed by driving in the anchor bolt and then, after the completion of the mixing of the constituents effected by the necessary number of turns of the anchor bolt, further rotating the anchor bolt to cause the mechanical wedging of the expandably designed zone of the anchor bolt.

Since, in this method, the expanding device arranged in the outward zone of the anchor bolt can become operative, i.e. commence to be wedged against the wall of the drill hole, only when the anchor bolt has performed the number of turns, for example 30, required for good mixing of the constituents of the mortar or plastic, it is ensured that the worker inserting the bolt actually carries out this required number of turns. According to a practical form of the novel method, after a predetermined distance of penetration of the anchor bolt into the drill hole—preferably up to a point close to the bottom end of the drill hole—an anchor plate mounted loosely on the outer end of the anchor bolt comes to bear against the rock and at the same time a flange-like stop mounted on the anchor bolt comes to bear with a driving or entraining action against the lower end face of expanding elements which surround the anchor bolt. Further rotation of the anchor bolt is carried out until, owing to the resistance to continued rotation set up by the tension between the expanding elements wedged against the rock and the anchor plate, the rotating device (a hammer drill or the like) comes to a stop.

This anchor plate may be merely held to the bolt by a head formed thereon, the head being suitably designed for the application of a turning device; it is not necessary to provide the outer end of the bolt with a thread. The expanding wedging elements mounted on the anchor bolt for the purpose of carrying the new method into effect may be designed in various ways known per se.

Figure 1B:
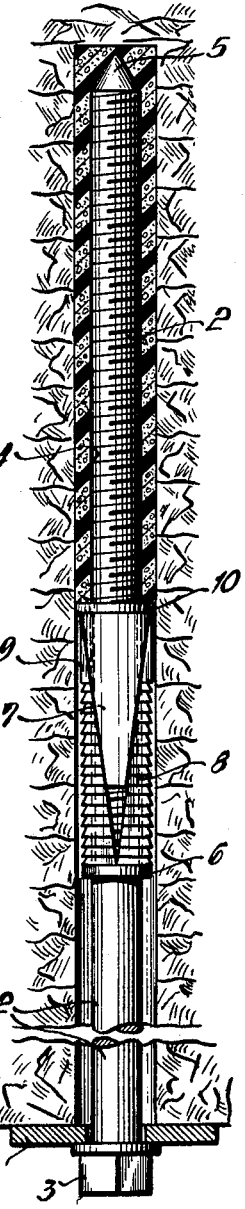
Figure 1C:
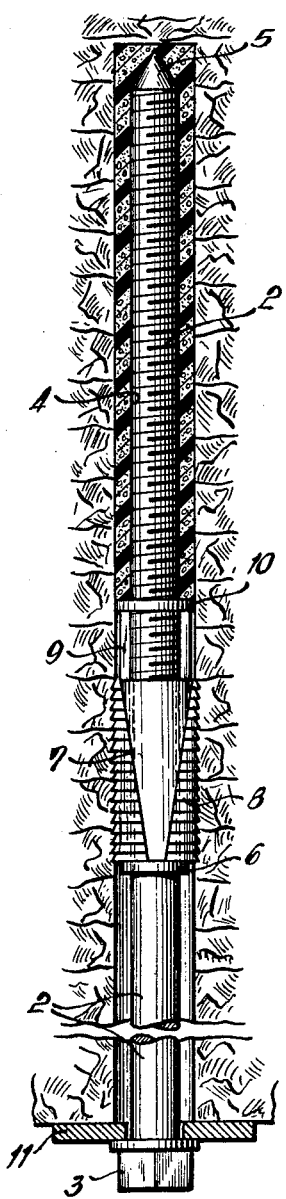
Figure 1D:
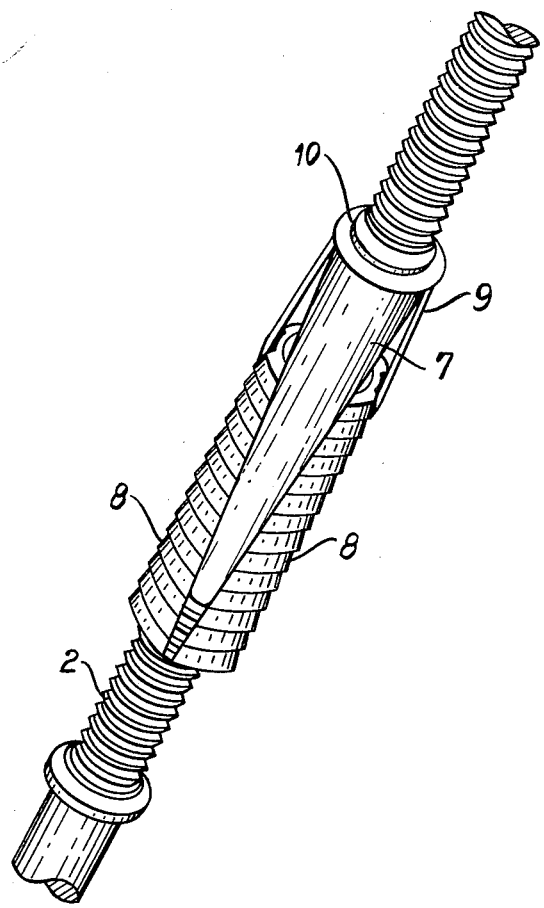

The invention will now be described by way of example with reference to the accompanying drawings, in which:

FIGURES 1a, 1b and 1c show various stages in the insertion of an anchor bolt comprising a first embodiment of the invention, FIGURE 1d is a fragmentary perspective view of the anchor bolt structure illustrated in FIGURES 1a, 1b and 1c, FIGURES 2a, 2b and 2c show various stages in the insertion of an anchor bolt comprising a second embodiment of the invention, and FIGURES 3a, 3b and 3c show various stages in the insertion of an anchor bolt comprising a third embodiment of the invention.

Referring now to FIGURES 1a to 1c these illustrate the three essential stages of the introduction of an anchor bolt 2 into a drill hole which is effected in one operation. The tip 5 of the anchor bolt penetrates into a cartridge 1 as the bolt is rotated, thus destroying the cartridge and effecting the mixing of the constituents of cementing material initially contained in the cartridge in separate compartments.

FIGURE 1a illustrates the destruction of the cartridge being initiated by the rotation of the anchor bolt, for example by means of a hammer drill engaged with a squared head 3 of the bolt. The contents of the cartridge run out in the course of the mixing process and fill the gap between the tip 5 of the anchor bolt 2 which is provided with a thread and the wall 4 of the drill hole.

An expanding device comprising wedging elements is mounted on a portion of the anchor bolt disposed outwardly of the tip 5, said expanding device surounding the anchor bolt and consisting of an expanding wedge 7 and a sleeve 8 comprising two half shells connected to one another by means of a ring 9. The curved ring 9 embraces both half shells and the expanding wedge 7 and is provided inwardly of the expanding wedge 7 with a bore through which the anchor bolt 2 passes.

The expanding wedge 7 is provided with two oppositely disposed grooves for receiving the ring 9. A sealing disc 10 is mounted on the anchor bolt inwardly of the expanding wedge 7 and the ring 9 and prevents the cementing mixture flowing back, particularly in upwardly directed drill holes. This sealing disc 10 is also necessary for limiting the size of the space which is to be filled by the cementing mixture and is located in dependence on the contents of the cartridge.

FIGURE 1b shows a subsequent stage of insertion when, after the anchor bolt 2 has been rotated further, an anchor plate 11 abuts against the face of the rock and substantially simultaneously a flange 6 of the anchor bolt abuts against the lower end face of the expanding elements. As the anchor bolt 2 is driven in further by a rotary action, the expanding wedge 7 is moved in the expanding sleeve 8 towards the mouth of the drill hole, as will readily be seen in FIGURE 1c, and the expansion is effected.

The distance of the expanding sleeve 8 from the flange before the anchor bolt is driven in is so proportioned that it corresponds to the number of turns of the anchor bolt required to mix the constituents of the cement or plastic mixture in the bottom of the drill hole.

FIGURE 1c shows the final position, when the expanding wedge 7 has caused the expanding sleeve 8 to dig into the wall of the drill hole and at the same time the anchor bolt is braced between this engaged zone and the anchor plate 11 so that it can now be subjected immediately to a load. The bracing effect which can be obtained depends on the torque of the tool (hammer drill or the like) employed for driving in the anchor bolt. The stopping of the tool is an indication that the anchor bolt has been properly located.

The arrangement shown in FIGURES 2a to 2c and 3a to 3c differ from the arrangements shown in FIGURES 1a to 1c only in the design of the expanding elements.

Referring to FIGURES 2a to 2c, the expanding wedge 7 is of round or square cross-section and is initially received to a small extent into a four-part expanding sleeve 8 which is held together by the flanged ring 12. Between the flanged ring 12 and the retaining flange 6 there is inserted a compression spring 13 the purpose of which is to prevent the expanding sleeve 8 from sliding away from the expanding wedge 7 during the driving in of the anchor bolt. The effect of the compression spring 13 is thus the same as that of the ring member 9 in the embodiment of FIGURES 1a to 1c.

Referring now to FIGURES 3a to 3c, an expanding element operating on the double-wedge principle is provided which consists of a wedge member 14 threaded on to the anchor bolt and a loose wedge member 15 slidable on the wedge member 14 and which is held by a curved member 16 above the wedge member 14. The curved member 16 is provided above the wedge member 14 with a bore for the passage of the anchor bolt 2; above the curved member 16 is provided a sealing disc 10.

The invention is not limited to the embodiments described above in detail and illustrated in the drawings and modifications are possible without departing from the invention as claimed in the following claims. In particular, as already mentioned, the new method can be applied when the plastic or cementing material is introduced into the bottom of the drill hole by means of pressure pipes which, for example, operate on the thrust-impregnation principle. This latter method may be particularly advantageous, if before the anchor bolt is introduced, the cohesion of the rock has been lost to such an extent that it is necessary to strengthen the rock by means of plastic forced into the cracks therein.

We claim:

1. An anchor bolt assembly for insertion into a drill hole which has been partially sealed with a cement material to support mine workings and the like comprising:

an elongate bolt member having an externally threaded portion extending from one end toward the other end thereof;

a radially extending annular sealing disk threadedly engaged on the threaded portion of said bolt member intermediate the ends thereof and having its peripheral edge adapted to be in close proximity to the inner surface of the associated drill hole to maintain the cementing material in the region of the one end of said bolt member;

a flange fixedly secured to said bolt member intermediate said sealing disk and the other end of said bolt member;

wedge means disposed about said bolt member between and engageable with said sealing disk and said flange whereby when relative rotational movement is effected between the threaded portion of said bolt member and said sealing disk, said wedge means is compressed between said disk and said flange, causing the same to expand radially into intimate contact with the inner surface of the associated drill hole;

and means for abutting the outer surface surrounding the drill hole affixed to the other end of said bolt member.

2. An anchor bolt assembly for insertion into a drill hole which has been partially sealed with a cement material to support mine workings and the like comprising:

an elongate bolt member having an externally threaded portion extending from one end toward the other end thereof;

a radially extending annular sealing disk threadedly engaged on the threaded portion of said bolt member intermediate the ends thereof and having its peripheral edge adapted to be in close proximity to the inner surface of the associated drill hole to maintain the cementing material in the region of the one end of said bolt member;

a flange fixedly secured to said bolt member intermediate said sealing disk and the other end of said bolt member;

wedge means disposed about said bolt member between and engageable with said sealing disk and said flange whereby when relative rotational movement is effected between the threaded portion of said bolt member and said sealing disk, said wedge means is compressed between said disk and said flange, causing the same to expand radially into intimate contact with the inner surface of the associated drill hole;

spring means mounted on said bolt member and interposed between said flange and said wedge means to initiate the radial expansion of said wedge means when said spring means is compressed to a predetermined degree;

and means for abutting the outer surface surrounding the drill hole affixed to the other end of said bolt member.

References Cited by the Examiner
UNITED STATES PATENTS

| | | | |
|---|---|---|---|
| 2,849,866 | 9/58 | Flygare et al. | 61—45 |
| 2,952,129 | 9/60 | Dempsey | 61—45 |

FOREIGN PATENTS

| | | |
|---|---|---|
| 933,382 | 9/55 | Germany. |
| 1,021,556 | 12/57 | Germany. |
| 94,169 | 6/59 | Norway. |

EARL J. WITMER, *Primary Examiner.*

JACOB L. NACKENOFF, JACOB SHAPIRO,
*Examiners.*